United States Patent [19]

Lohaus

[11] Patent Number: 5,788,042
[45] Date of Patent: Aug. 4, 1998

[54] CLUTCH DISK FOR A FRICTION CLUTCH

[75] Inventor: Norbert Lohaus, Schweinfurt, Germany

[73] Assignee: Mannesmann Sachs AG, Schweinfurt, Germany

[21] Appl. No.: 726,639

[22] Filed: Oct. 7, 1996

[30] Foreign Application Priority Data

Oct. 21, 1995 [DE] Germany ............ 195 39 263.9

[51] Int. Cl.⁶ ............................................. F16D 23/64
[52] U.S. Cl. ............................ 192/213.2; 192/70.17
[58] Field of Search ............... 192/70.17, 213.2, 192/213.21, 213.22, 213.1

[56] References Cited

U.S. PATENT DOCUMENTS 3,974,903  8/1976  de Gennes.
5,209,334  5/1993  Fischer.
5,213,188  5/1993  Feser et al..
5,542,516  8/1996  Wack ..................... 192/213.22 X

*Primary Examiner*—Rodney H. Bonck
*Assistant Examiner*—Saúl J. Rodriguez
*Attorney, Agent, or Firm*—Cohen, Pontani, Lieberman & Pavane

[57] ABSTRACT

A clutch disk for a friction clutch, especially for motor vehicles, has a driver disk with friction facings and a cover plate which is connected with the driver disk so as to be fixed with respect to rotation thereto. A hub disk and at least one control plate provided with two diametral arms are held between the driver disk and the cover plate. The hub disk, the cover plate and the driver disk are provided with windows in order to receive springs. The windows provided in the hub disk have, on at least one circumferential edge, a recess extending substantially in the circumferential direction. The arms of the control plate are provided with stop tabs on the radially outer side. The stop tabs cooperate with the radial outer region of the springs and, in the region of the stop tabs, the windows in the hub disk are enlarged along the circumference corresponding to the material thickness of the stop tabs.

4 Claims, 3 Drawing Sheets

1

CLUTCH DISK FOR A FRICTION CLUTCH

BACKGROUND OF THE INVENTION

1. Field of the Invention

The invention is directed to a clutch disk for a friction clutch, especially for motor vehicles, with a driver disk having friction facings and a cover plate which is connected with the driver disk so as to be fixed with respect to rotation thereto. A hub disk and at least one control plate provided with two diametral arms are held between the driver disk and the cover plate. The hub disk is provided with windows and the cover plate and driver disk are provided with pockets in order to receive springs. The windows have, on at least one circumferential edge, a recess extending substantially in the circumferential direction and the arms of the control plate are provided with stop tabs on the outer side radially.

2. Discussion of the Prior Art

A clutch disk of this kind in similar form is disclosed, e.g., in German references DEOS 29 16 868 and DE 44 06 015.

In order to allow for relative movement between the driver disk or the cover plate, and the hub disk, the springs arranged in the pockets or windows are acted upon by the stop face of the control plate. There is a frictional engagement between the control disk and the cover plate. Insofar as a second control disk is provided there is also a frictional engagement between this second control disk and the driver disk. The stop faces of the control disk are provided at the diametral arms. One problem in a clutch disk of this kind is that the recess for the guide edge of the control plate is constructed in the lower region of the window provided in the hub disk so that there remains at the edge of the hub disk a sufficiently large stop face for the control plate. Accordingly, the weakest cross section of the hub disk must be additionally weakened apart from the spring windows. In order to prevent failure due to cracking or breaking of the hub disk, materials of suitably high quality must be used and/or the hub disk must have correspondingly large dimensions, which increases manufacturing costs and also adds to the weight.

SUMMARY OF THE INVENTION

The object of the present invention is to provide a clutch disk in which the previously mentioned disadvantages are eliminated.

Pursuant to this object, and others which will become apparent hereafter, one aspect of the present invention resides in providing stop tabs that cooperate with the radial outer region of the springs. Furthermore, in the region of the stop tabs, the windows in the hub disk are enlarged along the circumference to an extent corresponding to the material thickness of the stop tabs.

Accordingly, it is possible to lengthen the arms of the control plate in the radial direction so that they engage in the windows of the hub disk only in the outer region. In this way, the windows can be kept relatively short in their radial inner region resulting in a reduced loading of the hub disk, since greater distances can be maintained from one window to the other window in the radial inner region of the windows. The load on the hub disk can accordingly be considerably greater or, given the same degree of loading, the dimensioning of the hub disk can be reduced. There is no additional weakening of the weakest hub cross section, so that a clutch disk having springs and a control plate which are controlled only on the outside can transmit a greater angle of relative movement and/or a greater torque than known clutch disks without an increased space requirement.

In a preferred embodiment of the invention, the arms of the control plate have two stop tabs in each instance. These stop tabs act in the circumferential direction at both sides, creating the possibility of a stop in both directions.

In a further embodiment, the transition between the stop tabs and the base body of the control plate is provided with a stiffening or reinforcement which is arranged roughly in the radial center of the window of the hub disk which further increases the strength of the control disk.

In order to double the material thickness and accordingly increase stability, the stop tabs are preferably folded.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
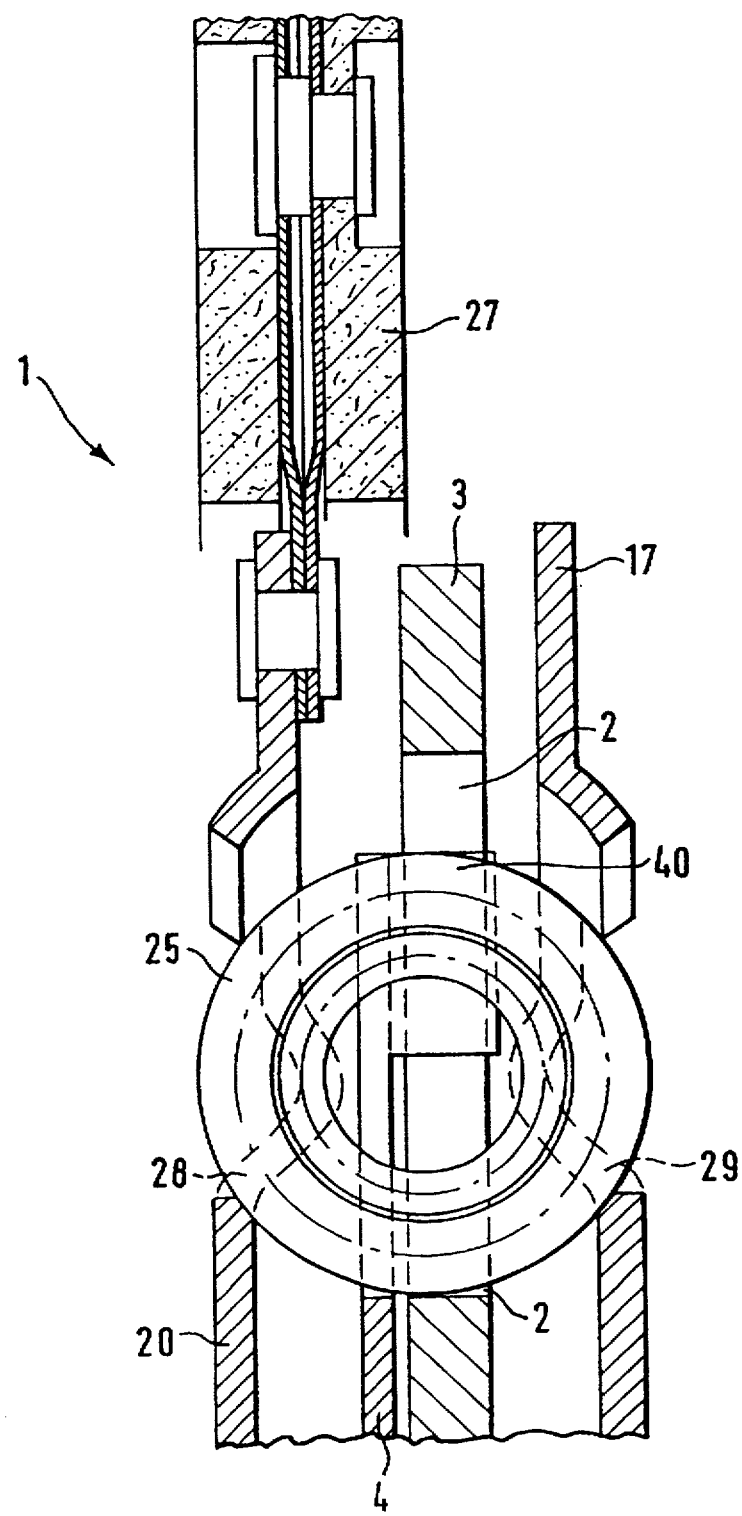
FIG. 1 is a partial longitudinal section through a clutch disk pursuant to the present invention.
Figure 2:
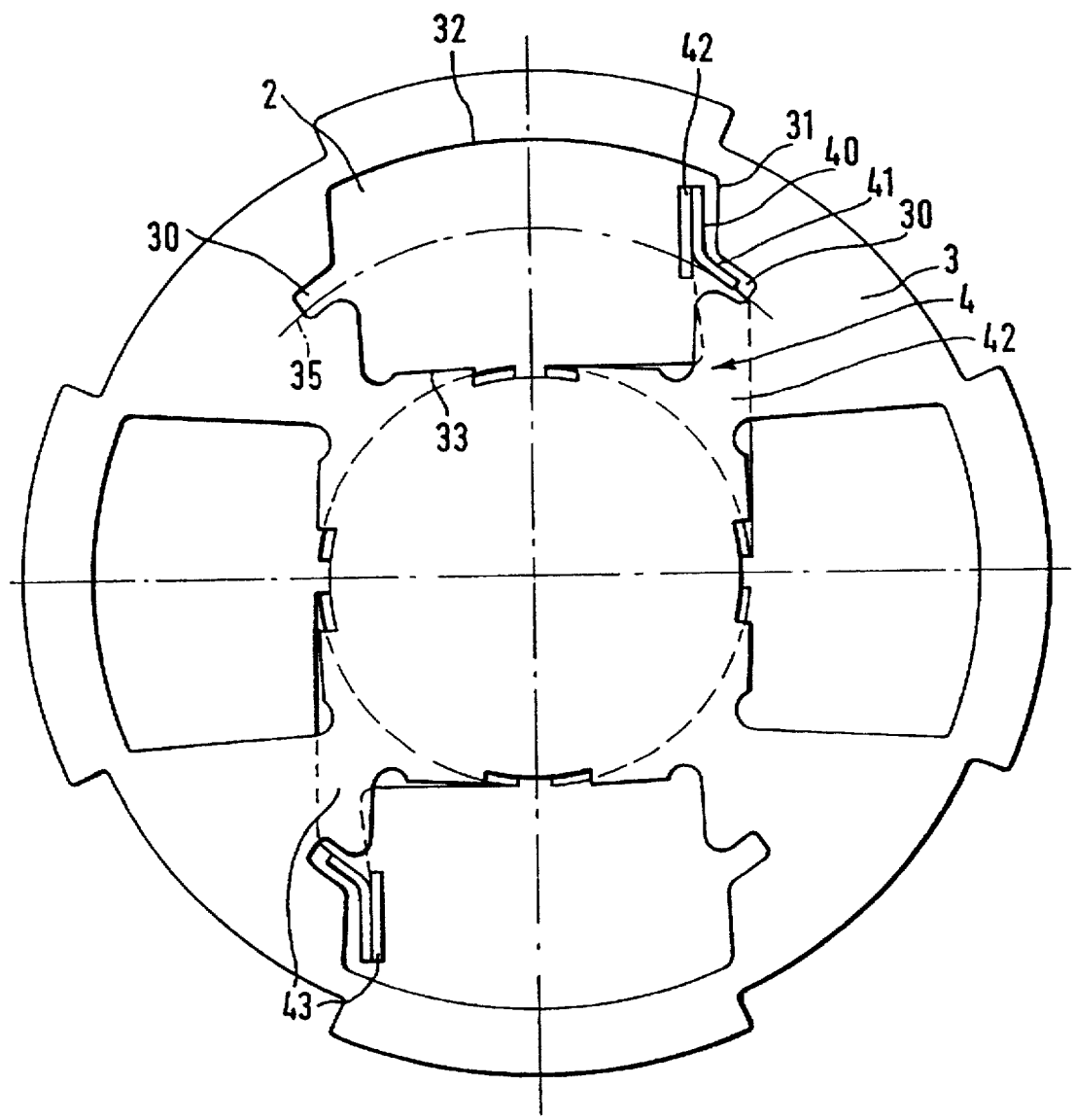
FIG. 2 is a top view of a hub disk with an inserted control plate.

FIG. 1 shows a partial longitudinal section through an embodiment of a clutch disk 1 with a hub disk 3 that is arranged concentric to a hub, not shown, and extends radially on the outside. The hub disk 3 has an internal toothing so that it can be placed on a gear shaft (axle 22), not shown in more detail, so as to be fixed with respect to rotation relative thereto. A driver disk 20 and a cover plate 17 are arranged coaxially to the hub disk 3, enclosing the hub disk 3 between them, and are connected with one another, e.g., via rivets, so as to be fixed with respect to relative rotation. The driver disk 20 is provided with friction facings 27 radially on the outside. The hub disk 3 is provided with windows 2 which are distributed along its circumference. The windows 2 serve to hold springs 25 for the load region.

The driver disk 20 and the cover plate 17 likewise have windows 28 and 29, respectively, which are aligned with the windows 2 provided in the hub disk 3. The control plate 4 communicates with the driver disk 20 via a frictional connection.

The control plate 4 is provided with two arms 42, 43 which face outward radially. The arms 42, 43 are provided at the radial outer side with stop tabs 40 which act on the springs 25 in the circumferential direction and which are adapted on their side remote of the springs 25 to the curvature of the circumferential edges 31 of the windows 2 in the hub disk 3. For this purpose, the arms 42, 43 are bent in the radial outer region axially in the direction of the hub disk 3 and engage in the recess 30 of the hub disk 3 with a reinforcement 41. To form the stop face at the circumferential edge 31 of the window 2, the radial outer edge 32 of the window 2 projects in the circumferential direction over the radial bottom edge 33 of the window 2. The recess 30 extends beyond the window 2 in the circumferential direction just above the radial center line 35. The stop tabs 40 are bent over in order to double the material thickness.

Figure 3:
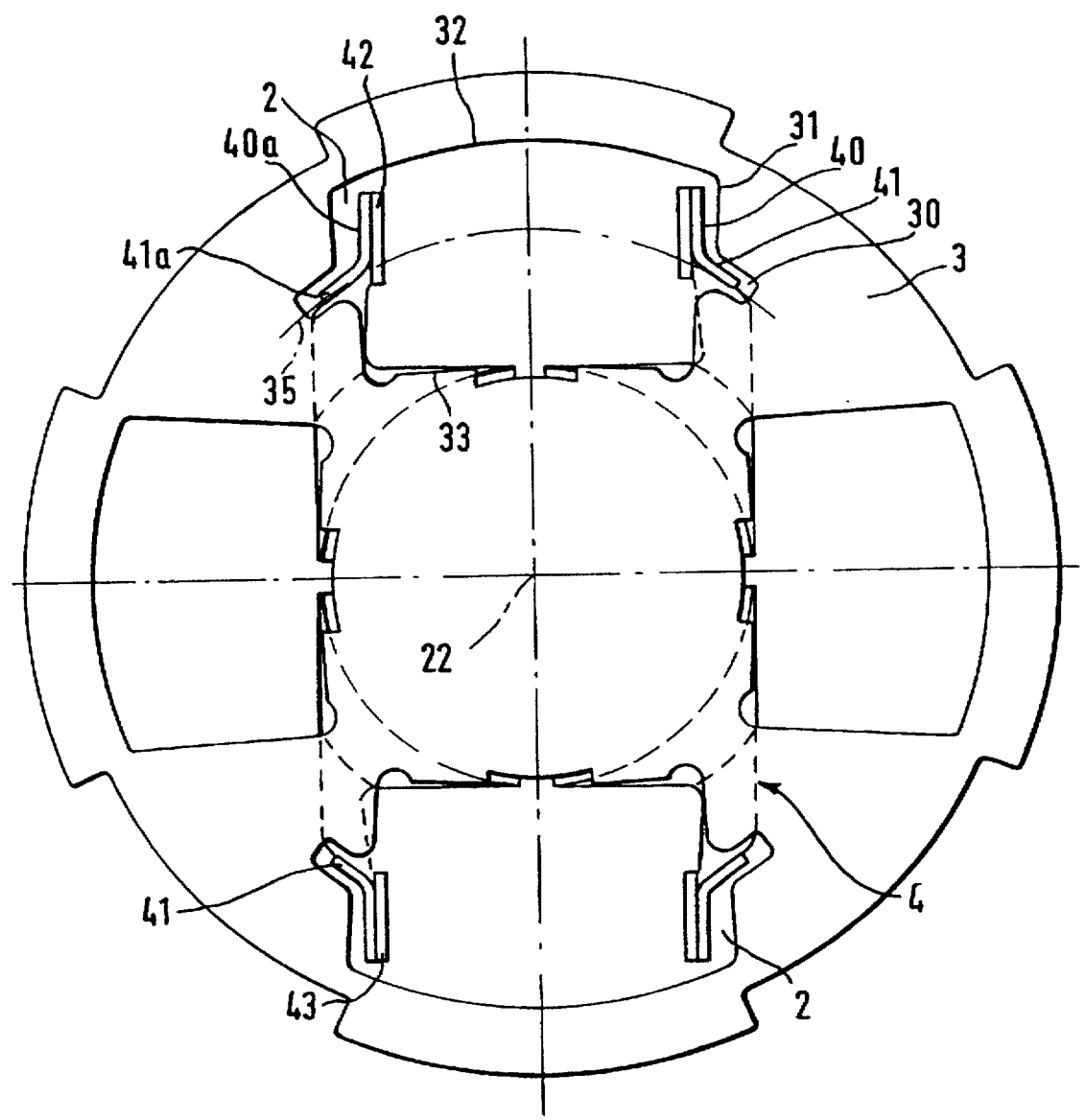
FIG. 3 is a top view of a hub disk with modified control plate.

As is shown in FIG. 3, the control plate 4 can be provided on both sides with reinforcements 41, 41a which engage in the recesses 30 which are then likewise provided on both sides. Two stop tabs 40, 40a are then provided at the arms 42, 43 in a corresponding manner. Due to the placement of the stop tabs 40, 40a far toward the outside radially, the loading of the inner cross section of the window 2 is correspondingly slight.

The invention is not limited by the embodiments described above which are presented as examples only but can be modified in various ways within the scope of protection defined by the appended patent claims.

I claim:

1. A clutch disk for a friction clutch, comprising: a driver disk having friction facings; a cover plate connected to the driver disk so as to be fixed with respect to rotation thereto; a hub disk; at least one control plate provided with two diametrally opposed arms, the hub disk and the control plate being held between the driver disk and the cover plate, the hub disk, the cover plate and the driver disk having windows; springs arranged in the windows, the windows in the hub disk having, on at least one circumferential edge, a recess that extends substantially in a circumferential direction; and axially bent stop tabs arranged on an outer radial side of the arms of the control plate so that the stop tabs only cooperate with a radial outer region of the springs on the outer periphery of the windows, the windows in the hub disk being enlarged in a region of the stop tabs along a circumference corresponding to a material thickness of the stop tabs, the recess being arranged in an extending region of the bent tabs so as to accept the bent tabs.

2. A clutch disk according to claim 1, wherein the arms of the control plate each have two stop tabs, the stop tabs being arranged so that one of the stop tabs is at each end of each sprint.

3. A clutch disk according to claim 1, wherein the control plate has a base body, the extension region of the tabs being provided as reinforcement in a transition between the stop tabs and the base body of the control plate so as to be arranged roughly in a radial center of the window of the hub disk.

4. A clutch disk according to claim 1, wherein the stop tabs are folded in order to double their material thickness.

* * * * *